Jan. 16, 1968    P. A. CHOMBARD ETAL    3,363,473
CENTRIFUGAL BRAKE FOR A GYROSCOPE WITH CARDAN SUSPENSION
Filed May 3, 1965    2 Sheets-Sheet 1
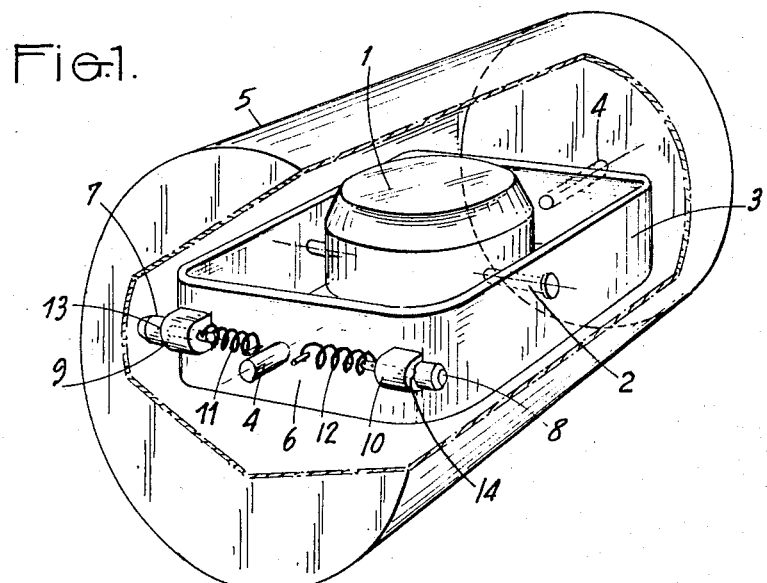
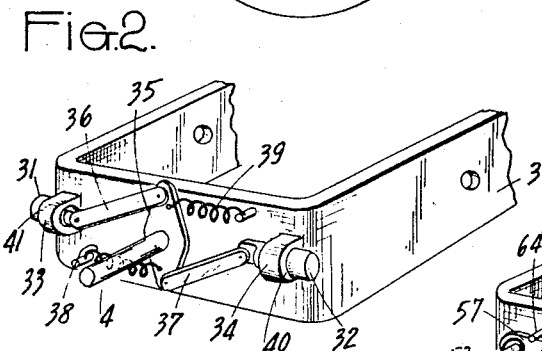 
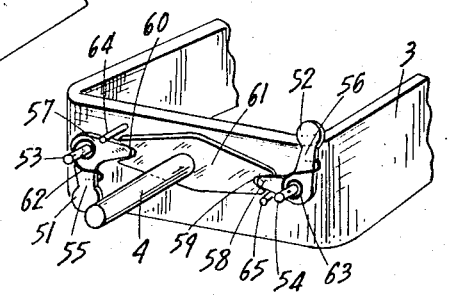
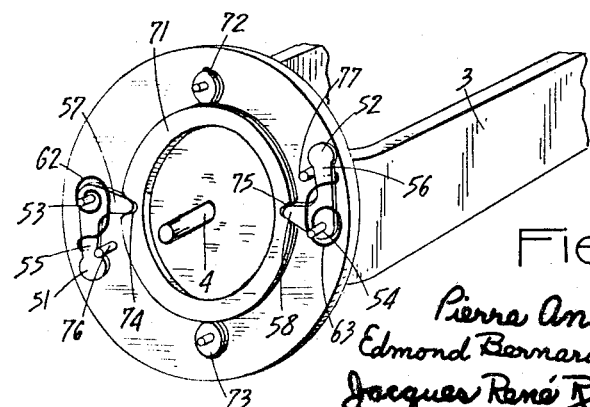
Inventors
Pierre André Chombard,
Edmond Bernard François Bonnefont,
Jacques René Rolland Rambaud
By Karl W. Flocks
attorney

3,363,473
CENTRIFUGAL BRAKE FOR A GYROSCOPE WITH CARDAN SUSPENSION

Pierre Andre Chombard, Boulogne-sur-Seine, Edmond Bernard Francois Bonnefont, Neuilly-Plaisance, and Jacques Rene Rolland Rambaud, Plessis-Robinson, France, assignors to Societe Francaise d'Equipements Pour la Navigation Aerienne (S.F.E.N.A.) Neuilly-sur-Seine, Seine, France, a joint-stock company of France
Filed May 3, 1965, Ser. No. 452,496
Claims priority, application France, May 11, 1964, 974,053
11 Claims. (Cl. 74—5.4)

The present invention relates to a centrifugal brake for gyroscopes with Cardan suspension and in particular, but not restrictively, for gyroscopic horizons and directional gyroscopes serving to indicate the position of an aircraft about its axes of rolling, pitching and course.

It is known that when the rotor of the gyroscope is rotating at its normal speed, the driving couple which ensures its rotation is equal to the resistance couple due to the bearings and the resistance of the air. The gyroscope then possesses the remarkable properties which justify its use, in particular the rotor shaft maintains a fixed orientation in space.

If the driving couple tends to diminish or to disappear, either accidentally in the case of a failure of supply, or voluntarily when it is desired to stop the instrument, the rotor continues to rotate under its own momentum, slowing-down as a result of the action of the resistance couple referred to above. If the rotor shaft is not perpendicular to the external axis of the Cardan suspension, this resistance couple has a component along the outer axis of the suspension, the action of which on the rotor results in a precession, that is to say in a rotation about the internal axis of the suspension which tends to bring the rotor shaft closer to the outer shaft of the suspension. This movement starts in the direction of the initial difference; it is very slow but its speed increases. In view of the existence of friction couples about the axes of the suspension, this movement practically only starts if the rotor shaft is sufficiently displaced from the perpendicular to the outer shaft of the suspension.

When this phenomenon takes place, the rotor shaft can come into alignment with the outer shaft of the suspension unless an abutment, generally provided on the inner ring of the suspension, does not previously stop the said movement by coming into contact with the outer ring of the suspension. In both cases, the movement of precession is stopped and another phenomenon makes its appearance: the rotor (on the assumption that it is still rotating) tends to drive in rotation all the gyroscopic system about its outer suspension shaft, at a speed which increases. This results in centrifugal forces which may cause damage to the instrument.

Devices are known which have been designed to prevent these unfortunate effects. They consist essentially, when the supply of the instrument is interrupted, voluntarily or otherwise, in causing the appearance of a stop or the action of a brake which limits the rotation about the outer shaft of the suspension. These devices have the disadvantage that at the same time they limit the possibilities of control of the vehicle by the gyroscope while this latter, continuing to rotate under its own momentum, can still be used for a fairly long time, for example in gyroscopic horizons, with ball erectors.

The present invention has for its object a centrifugal brake for a gyroscope with a Cardan suspension, which on the one hand eliminates the drawback of locking or braking the outer ring of the said suspension when the supply to the gyroscope is interrupted, as long as the gyroscope is rotating at a sufficient speed to permit the control of the evolutions of the gyroscope support, and in which on the other hand, the braking action is independent of the general acceleration generated in the gyroscope support during evolutions which the latter is to control, the said centrifugal brake functioning both in the case in which an abutment is provided to limit the relative displacement of the two suspension rings and in the case in which no abutment is provided.

The centrifugal brake for a gyroscope with a Cardan suspension according to the invention, comprises at least two fly-weights uniformly distributed on one face of the outer suspension ring, along a circumference having its centre located on the outer shaft of the suspension, each of the said fly-weights being coupled to the outer ring of the suspension and movable in a plane perpendicular to the outer shaft of the said suspension, so as to be able to come into frictional engagement with a cylindrical internal portion of the casing and thus to apply a breaking action on the rotation of the whole of the gyroscope and of its suspension about the outer shaft of this latter;

At least one restoring spring coupled to the fly-weights;

At least one stop limiting the travel of the fly-weights towards the interior of the casing; and A compensating device between the said fly-weights so that the inertia forces which may be generated by the general acceleration of the support during the course of its own evolutions, which evolutions it is the function of the gyroscope to control, cancel out and annul each other;

All the fly-weights being fixed in the position of rest by the stop or stops as long as the tension applied by the spring or springs on the said fly-weights is greater than the centrifugal forces which are generated by the rotation of the outer ring of the suspension about the outer shaft of this latter, and applying a braking action on the said rotation from the moment when its angular speed exceed an adjustable predetermined value.

The compensation device between the fly-weights acting so that the inertia forces which are generated by the general acceleration of the support during the course of its own evolutions may annul each other, consists of a central element coaxial with the outer shaft of the suspension and capable of rotating with the said shaft, on which element all the fly-weights are articulated in the same manner, the resultant of the said inertia forces being thus always zero.

The invention will be more clearly understood from the description which follows below of a certain number of forms of embodiment, reference being made to the accompanying drawings, in which:

FIG. 1 is a diagrammatic view in perspective of a gyroscope equipped with a first form of simplified construction of the invention, the fly-weights being at rest.

FIGS. 2, 3, 4 and 5 are respectively diagrammatic views of the outer ring of the suspension, provided with other forms of embodiment of the invention, the fly-weights being at rest.

Figure 5:
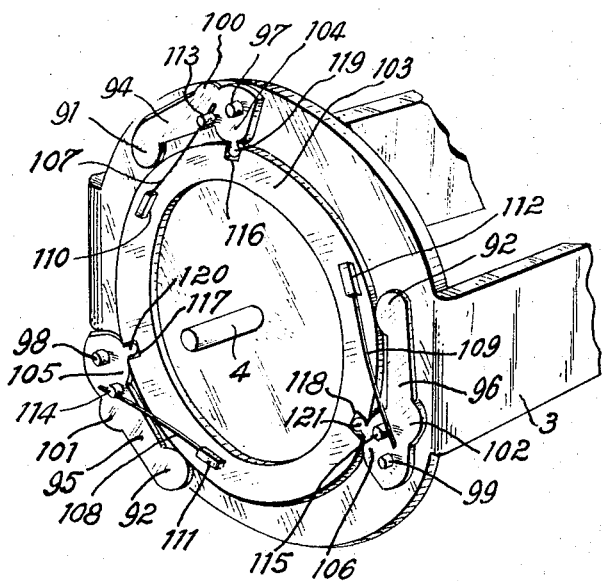

In FIG. 1, the gyroscope is enclosed in the casing 1, constituting the inner ring of the Cardan suspension, capable of rotating about the so-called interior shaft 2 supported by the outer ring 3, this latter being itself adapted to rotate about the so-called external shaft 4, supported by the casing 5 fixed on the supporting vehicle.

The braking device is mounted on the face 6 of the outer ring 3, transversely with respect to the outer shaft 4 of the Cardan suspension. It comprises two radial fly-weights 7 and 8 cylindrical and straight with a circular base, perpendicular to the shaft 4, guided in sockets 9 and 10 integral with the face 6, the internal bore of which has a shape corresponding to that of the fly-weights. Two straight springs 11 and 12 are fixed respectively to the two said fly-weights and are mounted in the same alignment as the fly-weights, each of their internal extremities being fixed on the face 6.

Each of the fly-weights 7 and 8 is provided with a shoulder 13, 14 (not shown on the drawing but readily understood) which, when it abuts against the outer lateral face of the corresponding socket 9, 10, limits the movement of the corresponding fly-weight towards the outer shaft of the suspension.

The whole of this centrifugal brake is symmetrical with respect to the outer shaft 4.

The fly-weights 7 and 8 are each subjected to the action of the following forces:

The tractive force applied by the corresponding spring 11, 12, initially adjusted to be at the most equal to the centrifugal force which is applied on one fly-weight at a pre-determined angular speed of the outer ring of the suspension, above which the preservation of the gyroscopic equipment is threatened;

The centrifugal force generated when the outer ring 3 rotates about the outer shaft 4;

The inertia force produced when the support is subjected to a general acceleration due to its own evolutions.

If it is assumed that the inertia forces due to the general acceleration of the support are zero or negligible, in particular if the support is stationary when the supply to the rotor is interrupted, the tension of each of the springs 11, 12 holds the corresponding fly-weight 7, 8 in the position of rest against its socket 9, 10 as long as the angular speed of the outer ring 3 does not exceed the said predetermined value.

If the support is in movement however, and if it is subjected to a general acceleration by reason of its own evolutions which the gyroscope is intended to control, the two fly-weights are each subjected, because of their diametrically-opposite positions, to equal and oppositely-acting inertia forces. If this force becomes greater than the tension of the restoring spring, the fly-weight concerned produces an untimely braking on the inner wall of the casing 5 and this has the effect of putting the gyroscope out of adjustment.

This undesirable braking may however be eliminated by adjusting the initial tension of each spring to a value such that the tractive force which it applies on its fly-weight is greater than the maximum inertia force which can be produced during the anticipated evolutions of the support.

Finally, in this form of construction of the centrifugal brake shown in FIG. 1, the device for compensating the inertia forces with respect to each other which can be generated in the fly-weights during the course of the evolutions of the support, is eliminated and replaced by an appropriate adjustment of the springs. It should however be observed that the centrifugal brake thus simplified only operates at sufficiently high angular speeds of the outer ring about the shaft of the suspension, which speeds may be undesirably high.

The forms of embodiment of the invention described below all comprise a compensating device between the fly-weights in order to eliminate the effects of the inertia forces which are applied to them during the course of the evolutions of the supports.

In FIG. 2, the two fly-weights 31 and 32, radial and perpendicular to the outer shaft 4, have again a straight cylindrical form and are guided in sockets 33 and 34 mounted in line with each other.

The compensating device is composed of an elongated central member 35, symmetrical with respect to the shaft 4 about which it can rotate, crank arms 36 and 37 connecting each of the extremities of the said central member to one of the said fly-weights.

A spring 38, 39 is fixed on the one hand to the central member 35, in the vicinity of each of its extremities, and on the other hand to the outer ring 3. The stops 40 and 41 limit the movement of the fly-weights 31, 32 in the direction of the outer shaft 4. It should be noted that a single stop and a single spring would be sufficient.

This compensating device balances against each other the inertia forces applied to the fly-weights 31, 32 during the course of the possible displacements of the support. The result of this equilibrium of the inertia forces generated in the said fly-weights is that the initial tension of the springs 38, 39 must be greater than the centrifugal forces which are generated in the said fly-weights by the rotation of the outer ring 3 about its shaft 4, as long as its angular speed is less than the angular speed capable of adversely affecting the performance of the gyroscopic system.

The forms of embodiment shown in the following FIGURES 3 and 4 also comprise a central member similar to that shown in FIG. 2 and only differing essentially from it in the shape of the fly-weights, their operation being identical.

In FIG. 3, which again represents a further form of construction with two fly-weights 51, 52, the latter are each constituted by a larger portion at the extremity of the arm 55 of an elbowed member and of the arm 56 of a second elbowed member, these two elbowed members being each capable of rotating about a fixed shaft on the outer ring 3, in the vicinity of their elbows. The free extremity of the other arm 57, 58 is engaged in a slot 59, 60 formed in each of the extremities of the elongated central member 61 which can rotate about the outer shaft 4 of the suspension.

A spiral spring 62, 63 is fixed on one side to the shaft 53, 54, in other words on the outer ring 3 and on the other side on the arm 55, 56 carrying the fly-weight 51, 52. This arm 55, 56 moves in a plane perpendicular to the outer shaft 4. This movement is blocked in the direction of this shaft 4 by the stop 64, 65.

In this case also, one only of the two stops 64, 65 and one only of the two springs 62, 63 would be sufficient.

All that has been stated on the subject of the operation of the form of construction of the centrifugal brake shown in FIG. 2 also applies to the present form of construction: the inertia forces acting on the fly-weights 51 and 52 during the course of the possible evolutions of the carrier are balanced between each other and the tension of each of the springs 62, 63 at the outset must be greater than the centrifugal force generated in each of the fly-weights by the rotation of the outer ring 3 about its shaft 4, as long as the angular speed of the outer ring 3 about the outer shaft 4 remains less than the angular speed which would be liable to affect adversely the gyroscopic system.

In FIG. 4, which represents a further form of construction with two fly-weights, the parts identical with those of FIG. 3 have been given the same reference numbers: these are the fly-weights 51 and 52 with their fixed shaft 53, 54, the arms 55 and 56, 57 and 58 of the two elbowed members and their spiral spring 62, 63.

This form of construction is employed in the case in which, for reasons of convenience of construction, it would be difficult to place a central member directly round the outer shaft, as in the case of FIGS. 2 and 3. The said central member is in this case replaced by a ring 71 centered on the outer shaft 4 and guided by two rollers 72 and 73 mounted on the outer ring 3 so as to be able to rotate about the said outer shaft. The rollers 72 and 73 and the ring 71 have complementary appropriate profiles so as to effect the axial driving of the ring 71. The ring 71 is provided with two slots 74 and 75, diametrically opposite to each other, in which are engaged the free extremities of the arms 57 and 58 of the elbowed members. Two stops 76 and 77 limit the movements of the arms of the fly-weights 55 and 56 in the direction of the internal shaft.

The operation of the centrifugal brake shown in FIG. 4 is similar to that of the brake of FIGS. 2 and 3.

A last form of construction with three fly-weights is shown in FIG. 5. These fly-weights are each constituted by an enlarged portion 91, 92 and 93 at the free extremity of a lever 94, 95 and 96 pivoted at its other extremity about a shaft 97, 98 and 99, rigidly fixed on the suspension ring 3.

A widened portion 100, 101 and 102, located between the shaft 97, 98 and 99 and the fly-weight 91, 92 and 93, can come into contact, in the position of braking of the levers 94, 95 and 96, with the inner wall of the casing (not shown) of the gyroscope. As in the form of embodiment of FIG. 4, the central member is a ring 103, coaxial with the shaft 4 of the outer suspension ring 3. The fly-weights 91, 92 and 93 serve as stops when they come into contact with the ring 103. The extremity of each of the levers 94, 95 and 96 in the vicinity of the shaft 97, 98 and 99 constitutes a roller member 104, 105 and 106, in contact with the ring 103, under the action of a spring 107, 108 and 109, mounted between an anchoring element 110, 111 and 112, fixed on the said ring 103, and a supporting member 113, 114 and 115 fixed to the said lever 94, 95 and 96. The centering of the ring 103 on the shaft 4 of the outer ring of the suspension is obtained by the three roller members 104, 105 and 106. The pivoting of the fly-weights to each other is effected as in FIG. 4, by means of the slots 116, 117 and 118 in the ring 103 and of the nipple 119, 120 and 121 of the lever 94, 95 and 96.

This latter form of construction, the operation of which is identical with that shown in FIG. 4, has however the following advantages as compared with this previous arrangement:

The braking caused by the fly-weights is intensified since its benefits from a lever effect, being applied by the widened portions 100, 101 and 102;

The use of three guiding fly-weights avoids the necessity of special devices for guiding the ring 103;

The stops are constituted by the fly-weights themselves.

The forms of construction described above have only been described and shown by way of example only and not in any limitative sense and modifications may be made thereto without thereby departing from the scope of the invention.

We claim:

1. A centrifugal brake for a gyroscope mounted with a Cardan suspension in a casing fixed on a moving support, of the kind in which the internal ring of said suspension comprises a stop for limiting the relative movements of the rotor shaft and the outer shaft of said suspension, said brake comprising at least two fly-weights uniformly spaced apart on one of the transverse faces of the outer suspension ring, along a circumference having its centre located on the outer shaft of said suspension, each of said fly-weights being coupled to the outer ring of said suspension and adapted to move in a plane perpendicular to the outer shaft of said suspension so as to be capable of coming into frictional contact with an internal cylindrical portion of said casing and thereby to apply a braking action on the rotation of the whole of the gyroscope and its suspension about the outer shaft of said suspension; at least one restoring spring coupled to said fly-weights, and at least one stop provided to limit the travel of said fly-weights towards the interior of the casing; and a device for compensating and annulling the inertia forces which may be generated in said fly-weights by the general acceleration of the support during the course of its own evolutions which said gyroscope is intended to control.

2. A centrifugal brake for a gyroscope mounted with a Cardan suspension as claimed in claim 1, in which all said fly-weights are immobilized in the position of rest by the stop which limits their travel towards the interior of said casing as long as the force exerted by said springs on said fly-weights is greater than the centrifugal forces generated by the rotation of the outer suspension ring about the outer shaft of said suspension, whereby a braking action is applied on said rotation from the moment when its angular speed exceeds an adjustable predetermined value.

3. A centrifugal brake for a gyroscope mounted with a Cardan suspension as claimed in claim 1, in which said compensating device which ensures that the inertia forces, generated in said fly-weights by the general acceleration of said support during the course of its own evolutions, mutually annul each other, comprises a central member coaxial with the outer shaft of said suspension and capable of rotating about said shaft, on which member all the fly-weights are pivoted in the same manner, the resultant of said inertia forces being therefore always zero.

4. A centrifugal brake for a gyroscope mounted with a Cardan suspension as claimed in claim 3, in which each of said fly-weights is constituted by a straight cylindrical member adapted to slide in a socket of corresponding shape and integral with the outer ring of said suspension, the common axis of a fly-weight and its socket intersecting the axis of the outer shaft of said suspension.

5. A centrifugal brake for a gyroscope mounted with a Cardan suspension as claimed in claim 4, in which each cylindrical fly-weight is formed with a shoulder for which the outer extremity of the socket constitutes the stop limiting displacement of said fly-weight towards the interior of said casing.

6. A centrifugal brake for a gyroscope mounted with a Cardan suspension as claimed in claim 1, in which each of said fly-weights is constituted by a widened portion at the extremity of an arm of an elbowed member articulated in the vicinity of the apex of its elbow about a shaft fixed on the outer ring of said suspension.

7. A centrifugal brake for a gyroscope mounted with a Cardan suspension comprising two diametrically-opposite radial cylindrical fly-weights, each provided with a shoulder for abutment against its associated socket as claimed in claim 4, and in which said central member is of elongated form, comprising two crank-arms each articulated on the inner extremity of the corresponding fly-weight and on one of the extremities of said elongated central member; at least one spring fixed at one of its extremities in the vicinity of one of the extremities of said central member and anchored at its other extremity to the outer ring of said suspension, the tension of said spring being less than the centrifugal force created by the rotation of said outer suspension ring about its outer shaft when the angular speed of the outer ring reached a pre-determined value.

8. A centrifugal brake for a gyroscope mounted with a Cardan suspension as claimed in claim 6, and comprising two fly-weights in which said central member is of elongated shape and comprises a spring disposed between one point of said elbowed member and a point on its fixed shaft, the free extremity of each of said elbowed members, which does not carry the fly-weight, being received in a slot formed in the extremity of said elongated central member; and at least one stop fixed on the outer ring of said suspension and adapted to limit the rotation of said elbowed members in the direction opposite to that corresponding to their braking action, the tension of said spring being less than the centrifugal force generated by the rotation of the gyroscope and its suspension about the outer shaft of said suspension, when the speed of said rotation reaches a pre-determined value.

9. A centrifugal brake for a gyroscope mounted with a Cardan suspension as claimed in claim 8, in which said elongated central member is replaced by a circular ring, coaxial with the shaft of the outer ring of said suspension; two rollers for guiding said circular ring, and at least one stop fixed on said outer suspension ring and adapted to limit the rotation of said elbowed members in the direction of the shaft of said outer suspension ring.

10. A centrifugal brake for a gyroscope mounted with a Cardan suspension as claimed in claim 9, in which said brake comprises three fly-weights and each said pivoted elbowed member is replaced by a lever pivoted at one of its extremities on said outer suspension ring and comprising a fly-weight at its free extremity and an intermediate expanded portion adapted to apply the braking force by coming into contact with the inner wall of said gyroscope casing, each spring being constituted by a blade mounted between an anchorage element on said circular ring and a supporting member on the corresponding lever or vice-versa, each stop being constituted by the fly-weight coming into contact with the ring and each lever being provided at its extremity close to its shaft with a roller member which centres said ring on the shaft of the outer suspension ring, and a nipple engaged in a slot formed in said ring.

11. A centrifugal brake for a gyroscope mounted with a Cardan suspension as claimed in claim 8, and comprising two fly-weights and a spring mounted on each fly-weight, in which the compensating device for balancing the inertia forces of said fly-weights generated by the general acceleration of said support is replaced by means for adjusting the tension of each of the two springs to a value higher than the maximum inertia force capable of being produced during the anticipated evolutions of said support.

No references cited.

FRED C. MATTERN, JR., *Primary Examiner.*

C. J. HUSAR, *Assistant Examiner.*